March 18, 1952 W. A. SESHER 2,589,876
PIPE AND GASKET JOINT
Filed Aug. 7, 1947 2 SHEETS—SHEET 1
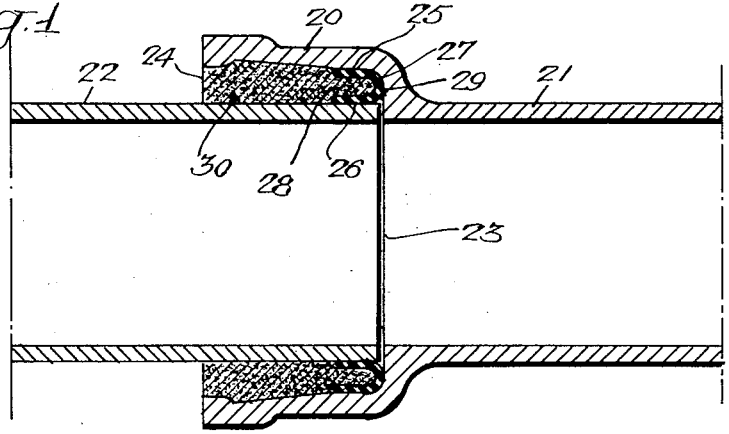
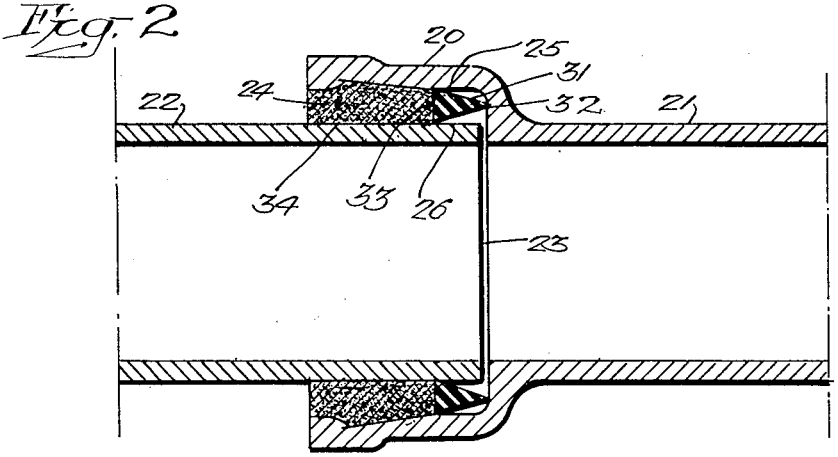
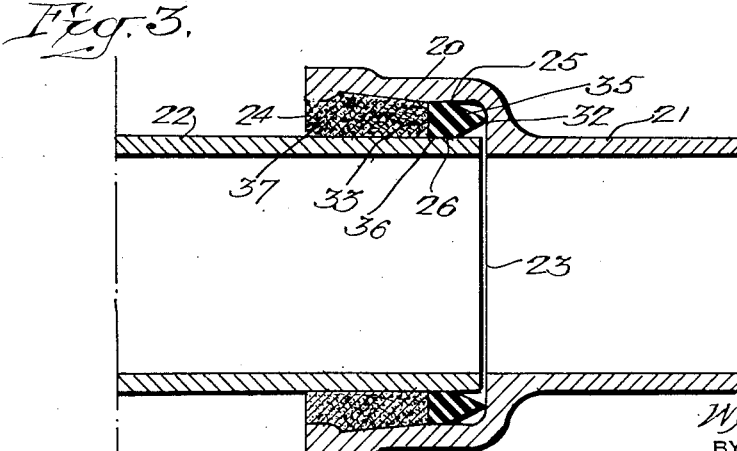
INVENTOR
William A. Sesher
BY
ATTORNEYS March 18, 1952 W. A. SESHER 2,589,876
PIPE AND GASKET JOINT
Filed Aug. 7, 1947 2 SHEETS—SHEET 2

INVENTOR
William A Sesher
BY
ATTORNEYS.

Patented Mar. 18, 1952

2,589,876

UNITED STATES PATENT OFFICE 2,589,876

PIPE AND GASKET JOINT

William A. Sesher, Springfield, Pa.

Application August 7, 1947, Serial No. 766,922

1 Claim. (Cl. 285—14)

My invention relates to pipe joints and gaskets therefor.

A purpose of my invention is to reduce the corrosion of metallic pipe at and adjoining the joints particularly when the pipe is in contact with the ground.

A further purpose is to reduce electrolytic corrosion of metallic pipe and particularly to reduce the corrosion due to stray electric currents in the ground.

A further purpose is to avoid the difficulty from the standpoint of corrosion caused by the use of electrically insulating cement such as sulphur cement in metallic pipe joints.

A further purpose is to provide a gasket of electrically conducting rubber for a pipe joint, which may conveniently be a bell and spigot joint, or a joint of other suitable character.

Other purposes appear in the specification and in the claim.

In the drawings I have chosen to illustrate a few only of the numerous embodiments in which my invention may appear, choosing the form shown from the standpoints of convenience in illustration, satisfactory operation and clear demonstration of the principles involved.

Figures 1, 2 and 3 are central longitudinal sections of a bell and spigot joint employing different characters of packing in accordance with the present invention.

In the drawings like numerals refer to like parts throughout.

Figure 4:
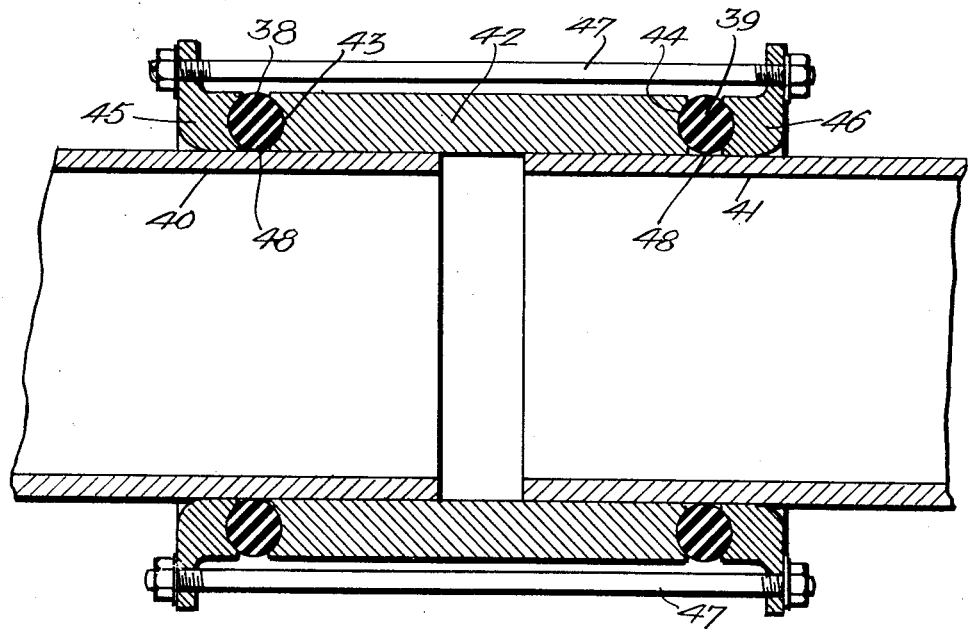
Figure 4 is a central longitudinal section of a pipe joint using rubber O-rings, which may be of the character of a Dresser coupling.

Describing in illustration but not in limitation and referring to the drawing:

In the prior art, corrosion has been a serious problem in metallic pipe, particularly when buried in the soil, and with special problems in cases of soils of particular characters. The general corrosive action which may occur is greatly accentuated at the pipe joints due to electrolytic effects, and this is particularly serious where stray electric currents are present in the ground.

The problem has been particularly serious in bell and spigot type joints and recently it has become noticeably more pronounced.

I have discovered that the difficulty encountered in the bell and spigot type of pipe joints has been due in part to the fact that at best the electrical connection across the joint is poor.

I have also discovered that the recent increased difficulty is due to the common practice of sealing bell and spigot joints with electrically insulating cements such as sulphur cement, rather than using lead packing or other electrically conducting packing as in the prior practice. The cheapness and convenience of the sulphur cements and the scarcity of lead have both contributed to extend the use of electrically insulating sealing materials.

I have discovered that in the bell and spigot type joints the difficulty previously encountered can be overcome without giving up the use of sulphur cements by substituting for the commonly used rubber sealing ring of electrically insulating character, a sealing ring of electrically conducting rubber.

During the last few years it has become known that rubber of electrically conducting character may be readily made by incorporating into the rubber batch carbon black of electrically conducting character (preferably acetylene black) which is not thoroughly homogenized through the mass by milling. Thus in making electrically conducting rubber a very minimum of milling is employed after the electrically conducting carbon black is incorporated.

Referring first to Figure 1, I there illustrate a bell and spigot joint 20 formed by a metallic bell end 21 suitably aligned and cooperating with a metallic spigot end 22. The pipes will preferably be of cast iron or steel as in well known practice. As normally is the case, a slight clearance is left at 23 between the end of the spigot and the adjoining portion of the bell, and the sides of the spigot are spaced from the bell to provide a sealing space 24 extending circumferentially around the pipe joint.

In prior art practice it is common to coat the metallic surfaces of the pipes, and where this has been accomplished I will preferably remove the coating over an annular band 25 around the internal surface near the base of the bell and around an annular band 26 on the outside circumference near the ends of the spigot.

Instead of the prior art electrically insulating rubber sealing ring, I will employ an annular sealing ring 27 of electrically conducting rubber, of any suitable shape, here a reversed U having an internal space 28 for receipt of sealing cement and a broad annular base 29 filling the bell at the pressure end. The remainder of the packing space 24 is filled with a suitable packing compound, here shown as sulphur cement 30.

It will thus be seen that while the pipes are insulated from one another by the spacing and the electrically insulating sulphur cement, electrical conduction across the joint is provided by the sealing ring or gasket 25, thus reducing the corrosion difficulty from electrolytic action in the presence of an electrolyte which may surround the pipe in the soil, and particularly reducing the corrosion due to stray electric currents in the ground.

In Figure 2 I illustrate a sealing ring 31 of wedge cross section, to illustrate that the sealing ring may be of any suitable shape.

The sealing ring 31 has its pointed annular end 32 directed toward the pressure and the flat base 33 directed away from the pressure and against the inner end of sealing compound, in this case lead packing 34.

In Figure 3 I illustrate a sealing ring 35 which differs from that of Figure 2 in that the electrically conducting rubber, instead of being of triangular cross section, has flat sides 36 adjoining the spigot and the bell with a wedge end toward the pressure with respect to the flat sides. In this form the remainder of the space inside the bell is filled at 37 with Portland cement.

It will be evident that the need for the invention is greater in the forms of Figures 1 and 3 where the packing other than the sealing ring is electrically insulating, than in Figure 2 where the packing other than the sealing ring is electrically conducting, but that even in the case of Figure 2 the invention is advantageous as increasing the conductivity across the joint.

The insertion of the sealing ring may follow usual practice, and be accomplished with the yarning iron.

It will be evident that the invention may be applied to other pipe joints which are not of the bell and spigot variety, although the invention is particularly useful in the field of bell and spigot joints.

In Figure 4 I illustrate a joint employing O-rings 38 and 39 of electrically conducting rubber which surround and seal against the ends 40 and 41 of metallic pipe, the pressure being exerted between a joint sealing ring 42 providing annular seats 43 and 44 for the O-rings at the ends and glands 45 and 46 on the opposite sides of the O-rings, tightened by bolts and nuts 47 extending across the joint.

It is preferable to remove any coating on the metal at 48 on the outside of each pipe against the O-ring and at 43 and 44 on the seats.

Figure 5:
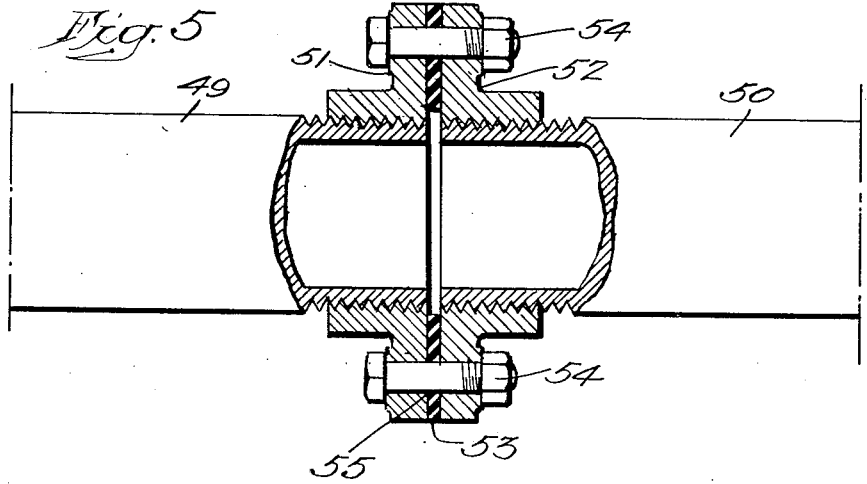
Figure 5 is an elevation partly in central longitudinal section showing a flanged joint with a gasket according to the invention.

In Figure 5 I illustrate a flanged joint formed by pipe sections 49 and 50 carrying abutting end flanges 51 and 52 which clamp a gasket 53 of electrically conducting rubber. The gasket is drawn tight by bolts and nuts 54. The cooperating faces 55 of the metallic flanges are suitably free from metallic coating so as to improve the conductivity across the joint by exposing bare metal to the gasket.

It will be evident that in operation the various joints will be assembled as in prior art practice, using electrically conducting rubber gaskets rather than non-conducting rubber gaskets.

The rubber employed may, of course, be of a durometer to suit the particular gasket application as well known in the art. Normally durometer readings will range between 30 and 80 on work of this character.

The rubber may be natural or synthetic rubber, and if synthetic rubber it may be Buna S, Buna N, Neoprene (polychloroprene) or Thiokol.

It will be evident that the invention may be applied to a wide variety of gasketed pipe joints, whether the medium in the pipe be a liquid, a gas, or a suspension.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claim.

Having thus described my invention what I claim as new and desire to secure by Letters Patent is:

In a pipe joint, a pair of cooperating pipes having bell and spigot meeting ends forming a bell space for packing around the spigot, a sealing ring of rubber containing electrically conductive material distributed throughout the cross section of the rubber which makes the whole cross section of the sealing ring electrically conductive, at the base of the bell space and a mass of electrically insulating cement filling the bell space beyond the sealing ring.

WILLIAM A. SESHER.

REFERENCES CITED

The following references are of record in the file of this patent:

UNITED STATES PATENTS

| Number | Name | Date |
|---|---|---|
| 859,813 | Hartman | July 9, 1907 |
| 1,032,295 | Politz | July 9, 1912 |
| 1,290,205 | Howell | Jan. 7, 1919 |
| 2,247,609 | De Vilbiss | July 1, 1941 |
| 2,379,942 | Webber | July 10, 1945 |
| 2,390,905 | Wening et al. | Dec. 11, 1945 |
| 2,401,554 | Davids | June 4, 1946 |
| 2,450,532 | Tognola | Oct. 5, 1948 |
| 2,454,567 | Pierson | Nov. 23, 1948 |